(12) United States Patent
Halberstadt et al.

(10) Patent No.: US 12,038,159 B2
(45) Date of Patent: Jul. 16, 2024

(54) METHOD FOR CREATING XYZ FOCUS PATHS WITH A USER DEVICE

(71) Applicant: Electronic Theatre Controls, Inc., Middleton, WI (US)

(72) Inventors: Matthew Halberstadt, Middleton, WI (US); Christopher Mizerak, Oceanside, CA (US); Dennis Varian, Madison, WI (US); Dan Duffy, Middleton, WI (US); Ethan White, Verona, WI (US)

(73) Assignee: Electronic Theatre Controls, Inc., Middleton, WI (US)

( * ) Notice: Subject to any disclaimer, the term of this patent is extended or adjusted under 35 U.S.C. 154(b) by 0 days.

(21) Appl. No.: 17/877,253

(22) Filed: Jul. 29, 2022

(65) Prior Publication Data

US 2024/0035648 A1 Feb. 1, 2024

(51) Int. Cl.
*F21V 21/15* (2006.01)
*F21W 131/406* (2006.01)
*G06F 3/0346* (2013.01)

(52) U.S. Cl.
CPC ....... *F21V 21/15* (2013.01); *F21W 2131/406* (2013.01); *G06F 3/0346* (2013.01)

(58) Field of Classification Search
CPC .... F21W 2131/406; F21V 14/02; F21V 21/15
See application file for complete search history.

(56) References Cited

U.S. PATENT DOCUMENTS

| 9,677,755 | B1* | 6/2017 | Linnell ............... H05B 47/155 |
| 10,973,106 | B2 | 4/2021 | Sanders et al. |
| 2002/0149940 | A1 | 10/2002 | Fruhm et al. |

(Continued)

FOREIGN PATENT DOCUMENTS

| EP | 3592119 A1 | 1/2020 |
| GB | 2499123 A | 8/2013 |
| GB | 2581246 A | 8/2020 |

(Continued)

OTHER PUBLICATIONS

United Kingdom Patent Office Search Report for Application No. GB2310330.2 dated Dec. 22, 2023 (4 pages).

*Primary Examiner* — Sean P Gramling
(74) *Attorney, Agent, or Firm* — Michael Best & Friedrich LLP (57) ABSTRACT

A method for operating a lighting fixture. The method includes positioning a user device at a first interaction point in a venue, designating a first light attribute, the first light attribute including at least one of a first light color, a first light intensity, and a first light focus corresponding to the first interaction point, moving the user device to a second interaction point, and designating a second light attribute, the second light attribute including at least one of a second light color, a second light intensity, and a second light focus corresponding to the second interaction point, the second light attribute being different than the first light attribute. The method further includes controlling the lighting fixture to direct light having the first light attribute toward the first interaction point and controlling the lighting fixture to direct light having the second light attribute toward the second interaction point.

21 Claims, 9 Drawing Sheets

(56) References Cited

U.S. PATENT DOCUMENTS

2019/0021152 A1   1/2019  Matsuo

FOREIGN PATENT DOCUMENTS

| | | |
|---|---|---|
| GB | 2581247 A | 8/2020 |
| GB | 2581248 A | 8/2020 |
| GB | 2581249 A | 8/2020 |
| GB | 2581418 A | 8/2020 |

\* cited by examiner

METHOD FOR CREATING XYZ FOCUS PATHS WITH A USER DEVICE

FIELD

Embodiments described herein relate to creating three-dimensional focus paths with a user device for directing or controlling a lighting fixture in a venue.

SUMMARY

Systems and methods described herein relate to rendering lighting visuals in a virtual reality or augmented reality interactive environment to allow a user to experiment with and discover the lighting visuals (e.g., a light beam, a lighting transition, a follow spot, etc.) available for a given venue and/or lighting fixture arrangement. Three-dimensional models of the potential locations of lighting beams for given lighting fixtures are created and made available in the interactive environment. These models include three-dimensional representations of lighting beams and other lighting visuals, or the models can be used as a three-dimensional model space bounding the possible lighting beam destinations for a given lighting fixture in the real world. In some embodiments, the user directs one or more lighting fixtures with the aid of a user device by indicating a desired path for the lighting fixture to follow based on designated interaction points.

One component of accurately directing the one or more lighting fixtures to follow a desired path is determining three-dimensional position data of the designated interaction point. In some situations, a user may want to plot a path with a handheld user device including the interaction points and communicate the path to the lighting fixture. The lighting fixture may recreate the movement and illumination designated by the interaction points to follow the path or an object based on the three-dimensional position data.

Currently, three-dimensional position data is provided via live streams of data to the lighting controller via a user device. The live stream of data is interpreted by the lighting controller to control the movement of the lighting fixture. However, this requires complex live tracking systems and continuous streams of three-dimensional position data that results in complex positioning calculations and excessive amounts of data stored by the lighting controller.

Embodiments described herein remove the need of having complex live tracking systems or live streams of three-dimensional position data and allows the three-dimensional position data of an object to be learned using a hand-held user device in conjunction with the lighting controller. The lighting controller can replicate the movement of the object travelling along the path at each interaction point without a stream of continuous, live data and illuminate the interaction points accordingly. The system may record and playback the information in real time. The system may modify or playback the information at any point in time. During creating the path, the system also provides a user interface to create definable interaction points with a unique light attribute. The light attribute may include light intensity, light color, light focus and other parameters available to change. A learned path could also define boundaries or zones for certain interaction points.

To address the above concerns, embodiments described herein provide systems and methods for creating three-dimensional focus paths with a user device for directing or controlling a lighting fixture in a venue. Embodiments described herein determine the pertinent details about definable interaction points along the path (e.g., position, timing, etc.) without requiring expensive measuring tools, expert knowledge, or a significant amount of time.

Systems and methods are described herein for directing a lighting fixture in a venue. Embodiments described herein greatly reduce the amount of time to set up and adjust lighting fixtures for tasks, such as replicating light fixture movement and following an interaction point on a stage, without requiring expert knowledge.

Systems for controlling the operation of a lighting fixture are described herein. The system includes a lighting fixture, a user device, and a controller. The controller is in communication with the lighting fixture and the user device, the controller includes an electronic processor and a memory, the memory storing instructions that when executed by the electronic processor configure the controller to operate the lighting fixture. The controller identifies a plurality of interaction points in a sequence, via the user device, in a venue. The controller receives a command associated with each respective interaction point, the command corresponding to at least one of light color, light intensity, and light focus. The controller controls the lighting fixture to move according to the sequence and change at least one of light color, light intensity, and light focus according to the commands.

In some embodiments, the system further includes at least one display associated with the user device, wherein the user device is configured to display, via the at least one display, a three-dimensional representation of the venue including the plurality of interaction points.

In some embodiments, the system further includes at least one camera associated with the user device, wherein the controller is further configured to identify the plurality of interaction points in the sequence based a capture view of the at least one camera.

In some embodiments, the controller determines a pan angle and a tilt angle of the lighting fixture based on a position and an orientation of the user device at each of the plurality of interaction points in the sequence.

In some embodiments, the command associated with each respective interaction point is different for each respective interaction point.

In some embodiments, the controller is housed within the user device.

In some embodiments, the controller is associated with a remote server.

In some embodiments, the controller is associated with a light control board.

Methods for controlling the operation of a lighting fixture are described herein. The method includes positioning a user device at a first interaction point in a venue. A first light attribute is designated via the user device, the first light attribute including at least one of a first light color, a first light intensity, and a first light focus corresponding to the first interaction point. The user device is moved to a second interaction point in a venue. A second light attribute is designated via the user device, the second light attribute including at least one of a second light color, a second light intensity, and a second light focus corresponding to the second interaction point, the second light attribute being different than the first light attribute. The controller controls the lighting fixture to direct light having the first light attribute toward the first interaction point. The controller controls the lighting fixture to direct light having the second light attribute toward the second interaction point.

In some embodiments, positioning the user device and designating the light attributes occurs before controlling the lighting fixture.

In some embodiments, the user device is positioned on a stage in the venue for both the first interaction point and the second interaction point, and the user device is not positioned on the stage in the venue while controlling the lighting fixture.

In some embodiments, the controlling the lighting fixture to direct light having the first light attribute toward the first interaction point includes determining a first pan angle and a first tilt angle of the lighting fixture based on a position and an orientation of the user device at the first interaction point and controlling the lighting fixture to direct light based on the first pan angle and the first tilt angle.

In some embodiments, the user device is associated with at least one camera and determining a first pan angle and a first tilt angle of the lighting fixture based on a position and an orientation of the user device at the first interaction point includes using a capture view of the at least one camera to determine the position and the orientation of the user device at the first interaction point.

In some embodiments, the controlling the lighting fixture to direct light having the second light attribute toward the second interaction point includes determining a second pan angle and a second tilt angle of the lighting fixture based on a position and an orientation of the user device at the second interaction point and controlling the light fixture to direct light based on the second pan angle and the second tilt angle.

In some embodiments, the user device is associated with at least one display. The method further includes displaying, via the at least one display, a three-dimensional representation of the venue including at least the first interaction point and the second interaction point.

Methods for controlling the operation of a lighting fixture are described herein. The method includes identifying a first interaction point, via a user device, in a venue with the lighting fixture turned off. A second interaction point is identified, via the user device, in the venue after identifying the first interaction point. The lighting fixture turns on after the first interaction point and the second interaction point have been identified. The controller automatically directs the lighting fixture to the first interaction point. The controller automatically directs the lighting fixture to the second interaction point after the first interaction point.

In some embodiments, the identifying a first interaction point, via a user device, in a venue with the lighting fixture turned off includes determining a first pan angle and a first tilt angle of the lighting fixture based on a position and an orientation of the user device at the first interaction point.

In some embodiments, the identifying a second interaction point, via the user device, in the venue after identifying the first interaction point includes determining a second pan angle and a second tilt angle of the lighting fixture based on a position and an orientation of the user device at the second interaction point.

In some embodiments, the method further includes communicating, via the user device, the first interaction point and the second interaction point to the lighting fixture after turning on the lighting fixture.

In some embodiments, the method further includes recreating, via the light fixture, the first pan angle and the first tilt angle prior to automatically directing the light fixture and recreating, via the light fixture, the second pan angle and the second tilt angle prior to automatically directing the light fixture.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers" and "computing devices" described in the specification can include one or more processing units, one or more computer-readable medium modules, one or more input/output interfaces, and various connections (e.g., a system bus) connecting the components.

Other aspects of the embodiments will become apparent by consideration of the detailed description and accompanying drawings.

DETAILED DESCRIPTION

Embodiments described herein relate to accurately determining arrangement information of one or more lighting fixtures and accurately focusing one or more lighting fixtures on a lighting beam destination. Both tasks conventionally require skilled technicians, precise and expensive measuring tools, and significant time. These tasks are achieved by acquiring arrangement information and subsequently controlling lighting fixtures based on the arrangement information.

Figure 1:
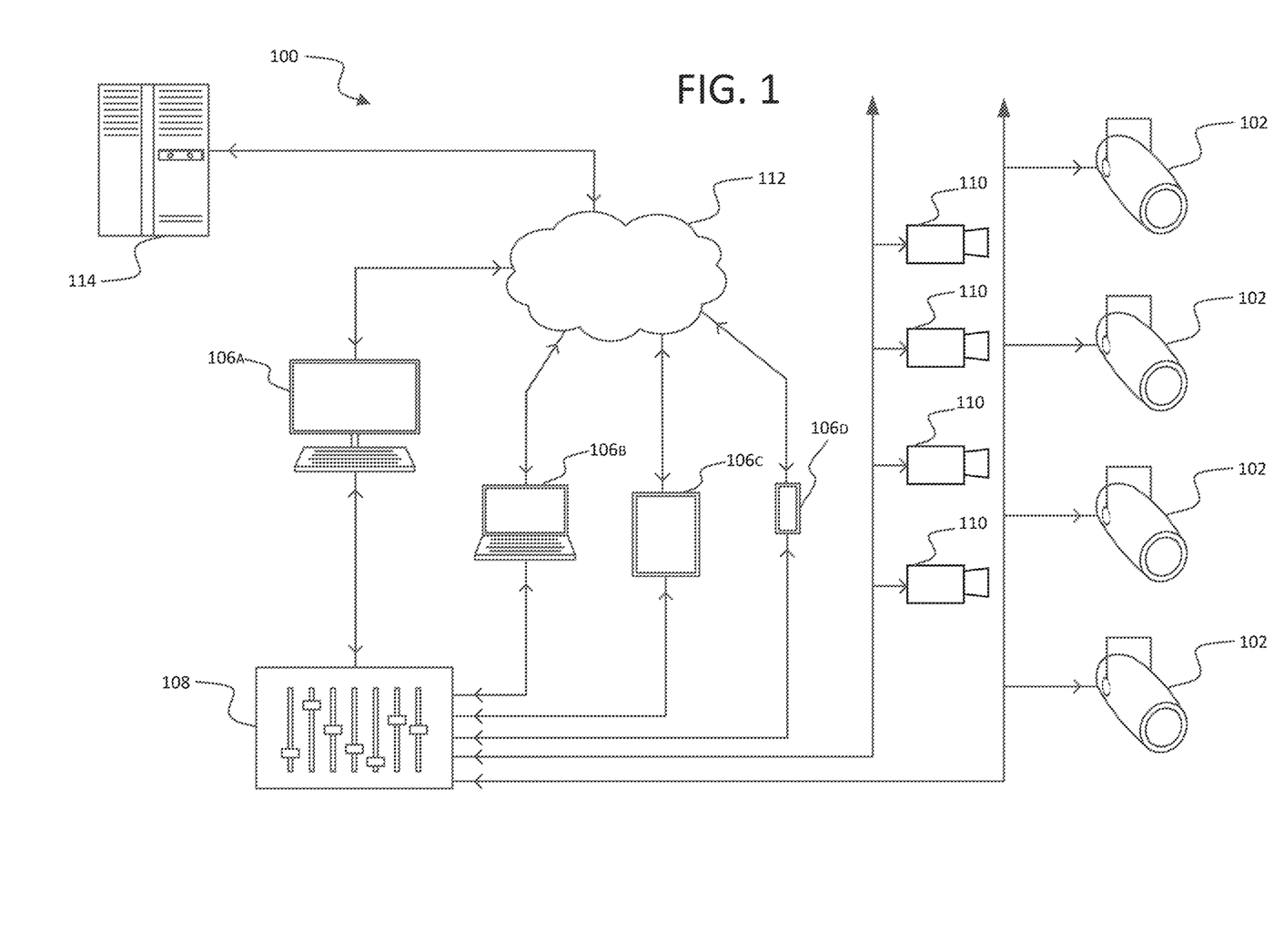
FIG. 1 illustrates a system for creating three-dimensional focus paths with a user device.

For example, FIG. 1 illustrates a system 100 for creating three-dimensional focus paths of one or more lighting fixtures 102 and subsequently directing the one or more lighting fixtures 102 in a venue 104 (shown in FIG. 3). The system 100 includes a user input device 106A-106D, a control board or control panel 108, lighting fixtures 102, cameras 110, a network 112, and a server-side computer or server 114. The user input device 106A-106D includes, for example, a personal or desktop computer 106A, a laptop computer 106B, a tablet computer 106C, or a mobile phone (e.g., a smart phone) 106D. Other user input devices include, for example, an augmented reality headset or glasses. In some embodiments, the cameras 110 are integrated with the user input device 106A-106D, such as the camera of the mobile phone 106D. In other embodiments, the cameras 110 are separate from the user input device 106A-106D.

The user input device 106A-106D is configured to communicatively connect to the server 114 through the network 112 and provide information to, or receive information from, the server 114 related to the control or operation of the system 100. The user input device 106A-106D is also configured to communicatively connect to the control board 108 to provide information to, or receive information from, the control board 108. The connections between the user input device 106A-106D and the control board 108 or network 112 are, for example, wired connections, wireless connections, or a combination of wireless and wired connections. Similarly, the connections between the server 114 and the network 112, the control board 108 and the lighting fixtures 102, or the control board 108 and the cameras 110 are wired connections, wireless connections, or a combination of wireless and wired connections.

The network 112 is, for example, a wide area network ("WAN") (e.g., a TCP/IP based network), a local area network ("LAN"), a neighborhood area network ("NAN"), a home area network ("HAN"), or personal area network ("PAN") employing any of a variety of communications protocols, such as Wi-Fi, Bluetooth, ZigBee, etc. In some implementations, the network 112 is a cellular network, such as, for example, a Global System for Mobile Communications ("GSM") network, a General Packet Radio Service ("GPRS") network, a Code Division Multiple Access ("CDMA") network, an Evolution-Data Optimized ("EV-DO") network, an Enhanced Data Rates for GSM Evolution ("EDGE") network, a 3GSM network, a 4GSM network, a 4G LTE network, a 5G New Radio, a Digital Enhanced Cordless Telecommunications ("DECT") network, a Digital AMPS ("IS-136/TDMA") network, or an Integrated Digital Enhanced Network ("iDEN") network, etc.

Figure 1A:
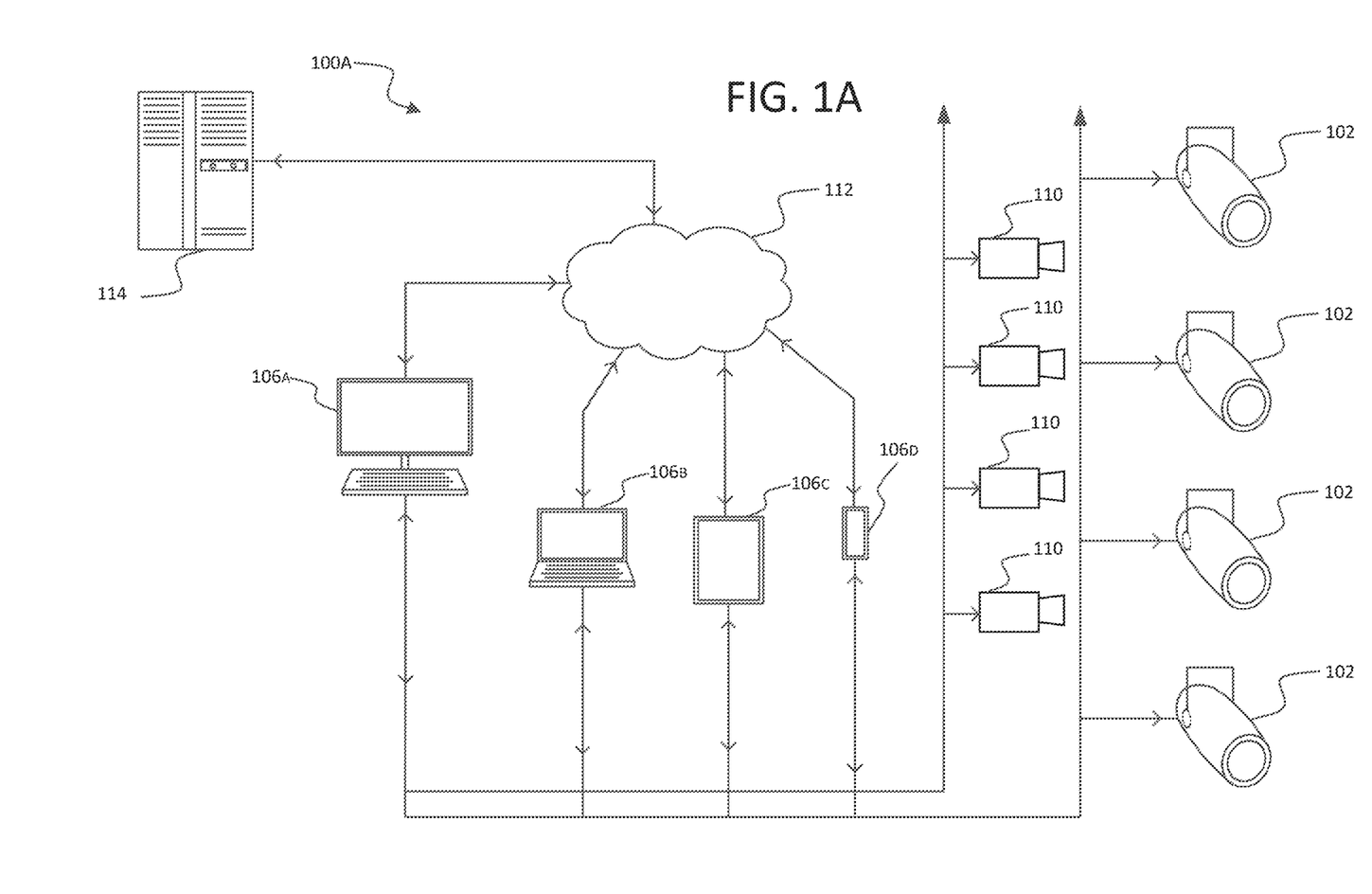
FIG. 1A illustrates another system for creating three-dimensional focus paths with a user device.

FIG. 1A illustrates an alternative system 100A for creating three-dimensional focus paths of one or more lighting fixtures 102 and subsequently controlling the lighting fixtures 102. The hardware of the alternative system 100A is identical to the above system 100, except the control board or control panel 108 is removed. As such, the user input device 106A-106D is configured to communicatively connect to the lighting fixtures 102 and to the cameras 110. The connections between the user input device 106A-106D and the lighting fixtures 102 and the connections between the user input device 106A-106D and the camera 110 are wired connections, wireless connections, or a combination of wireless and wired connections.

Figure 2:
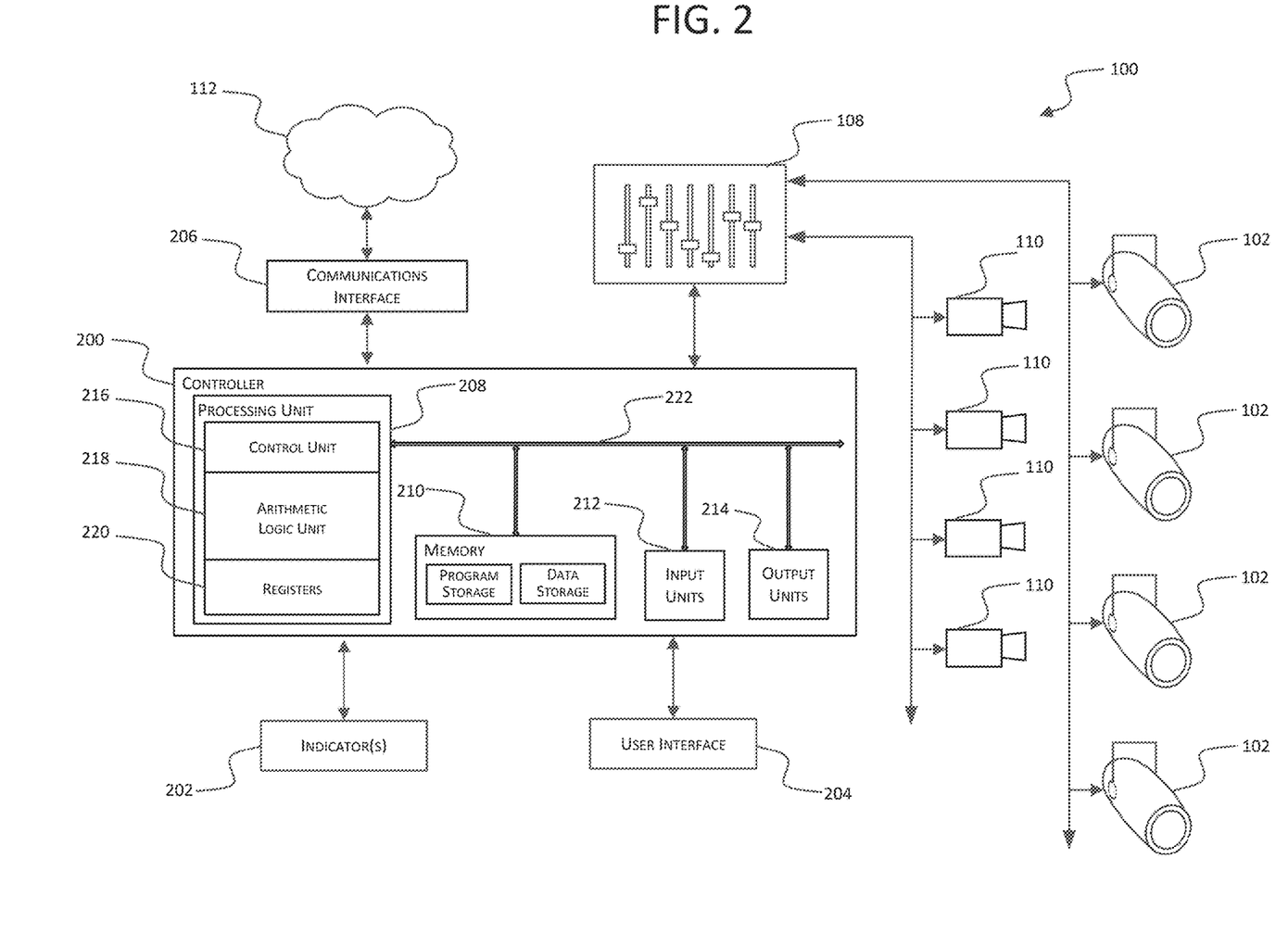
FIG. 2 illustrates a controller for the system of FIG. 1.

FIG. 2 illustrates a controller 200 for the system 100. The controller 200 is electrically and/or communicatively connected to a variety of modules or components of the system 100. For example, the illustrated controller 200 is connected to one or more indicators 202 (e.g., LEDs, a liquid crystal display ["LCD"], etc.), a user input or user interface 204 (e.g., a user interface of the user input device 106A-106D in FIG. 1), and a communications interface 206. The controller 200 is also connected to the control board 108. The communications interface 206 is connected to the network 112 to enable the controller 200 to communicate with the server 114. The controller 200 includes combinations of hardware and software that are operable to, among other things, control the operation of the system 100, control the operation of the lighting fixture 102, control the operation of the camera 110, receive one or more signals from the camera 110, communicate over the network 112, communicate with the control board 108, receive input from a user via the user interface 204, provide information to a user via the indicators 202, etc. In some embodiments, the indicators 202 and the user interface 204 are integrated together in the form of, for instance, a touch-screen.

In the embodiment illustrated in FIG. 2, the controller 200 is associated with the user input device 106A-106D. As a result, the controller 200 is illustrated in FIG. 2 as being connected to the control board 108 which is, in turn, connected to the lighting fixtures 102 and the cameras 110. In other embodiments, the controller 200 is included within the control board 108, and, for example, the controller 200 can provide control signals directly to the lighting fixtures 102 and the cameras 110. In other embodiments, the controller 200 is associated with the server 114 and communicates through the network 112 to provide control signals to the control board 108, the lighting fixtures 102, and/or the cameras 110.

The controller 200 includes a plurality of electrical and electronic components that provide power, operational control, and protection to the components and modules within the controller 200 and/or the system 100. For example, the controller 200 includes, among other things, a processing unit 208 (e.g., a microprocessor, a microcontroller, or another suitable programmable device), a memory 210, input units 212, and output units 214. The processing unit 208 includes, among other things, a control unit 216, an arithmetic logic unit ("ALU") 218, and a plurality of registers 220 (shown as a group of registers in FIG. 2), and is implemented using a known computer architecture (e.g., a modified Harvard architecture, a von Neumann architecture, etc.). The processing unit 208, the memory 210, the input units 212, and the output units 214, as well as the various modules or circuits connected to the controller 200 are connected by one or more control and/or data buses (e.g., common bus 222). The control and/or data buses are shown generally in FIG. 2 for illustrative purposes. The use of one or more control and/or data buses for the interconnection between and communication among the various modules, circuits, and components would be known to a person skilled in the art in view of the embodiments described herein.

The memory 210 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 208 is connected to the memory 210 and executes software instructions that are capable of being stored in a RAM of the memory 210 (e.g., during execution), a ROM of the memory 210 (e.g., on a generally permanent basis), or another non-transitory computer readable medium such as another memory or a disc. Software included in the implementation of the system 100 and controller 200 can be stored in the memory 210 of the controller 200. The software includes, for example, firmware, one or more applications, program data, filters, rules, one or more program modules, and other executable instructions. The controller 200 is configured to retrieve from the memory 210 and execute, among other things, instructions related to the control processes and methods described herein. In other embodiments, the controller 200 includes additional, fewer, or different components.

The user interface 204 is included to provide user control of the system 100, the lighting fixtures 102, and/or the cameras 110. The user interface 204 is operably coupled to the controller 200 to control, for example, control or drive signals provided to the lighting fixtures 102 and/or control or drive signals provided to the cameras 110. The user interface 204 can include any combination of digital and analog input devices required to achieve a desired level of control for the system 100. For example, the user interface 204 can include a computer having a display and input devices, a touchscreen display, a plurality of knobs, dials, switches, buttons, faders, or the like. In the embodiment illustrated in FIG. 2, the user interface 204 is separate from the control board 108. In other embodiments, the user interface 204 is included in the control board 108.

The controller 200 is configured to work in combination with the control board 108 to provide direct control or drive signals to the lighting fixtures 102 and/or the cameras 110. As described above, in some embodiments, the controller 200 is configured to provide direct control or drive signals to the lighting fixtures 102 and/or the cameras 110 without separately interacting with the control board 108 (e.g., the control board 108 includes the controller 200). The direct drive signals that are provided to the lighting fixtures 102 and/or the cameras 110 are provided, for example, based on a user input received by the controller 200 from the user interface 204. The controller 200 is also configured to receive one or more signals from the cameras 110 related to image or scan data.

Figure 2A:
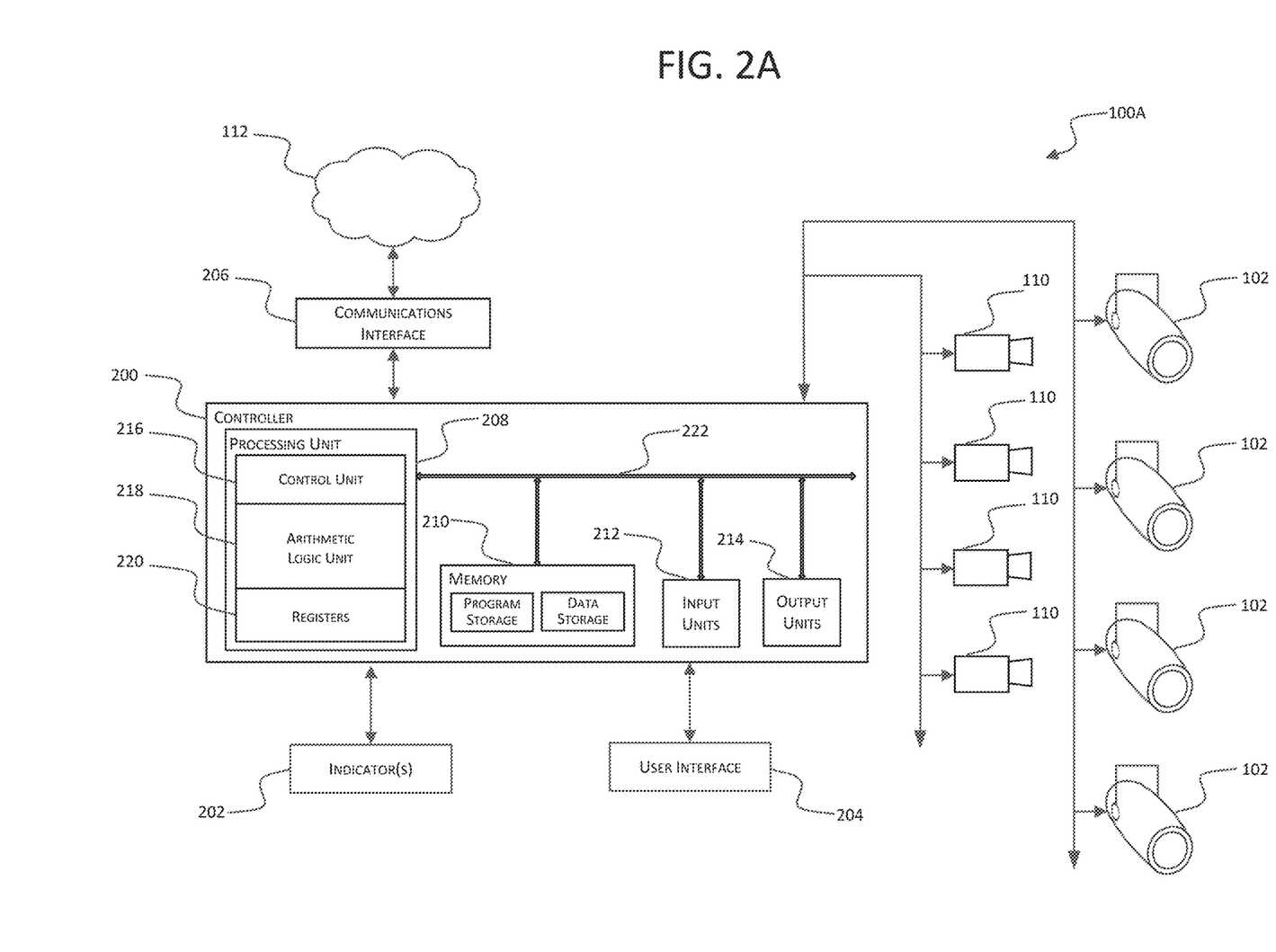
FIG. 2A illustrates a controller for the system of FIG. 1A.

As shown in FIG. 2A and described above, the system 100A includes the controller 200 configured to work without the control board 108, such that the controller 200 is configured to provide signals to the lighting fixtures 102 and/or the cameras 110 and to receive one or more signals from the cameras 110 related to image or scan data.

Figure 3:
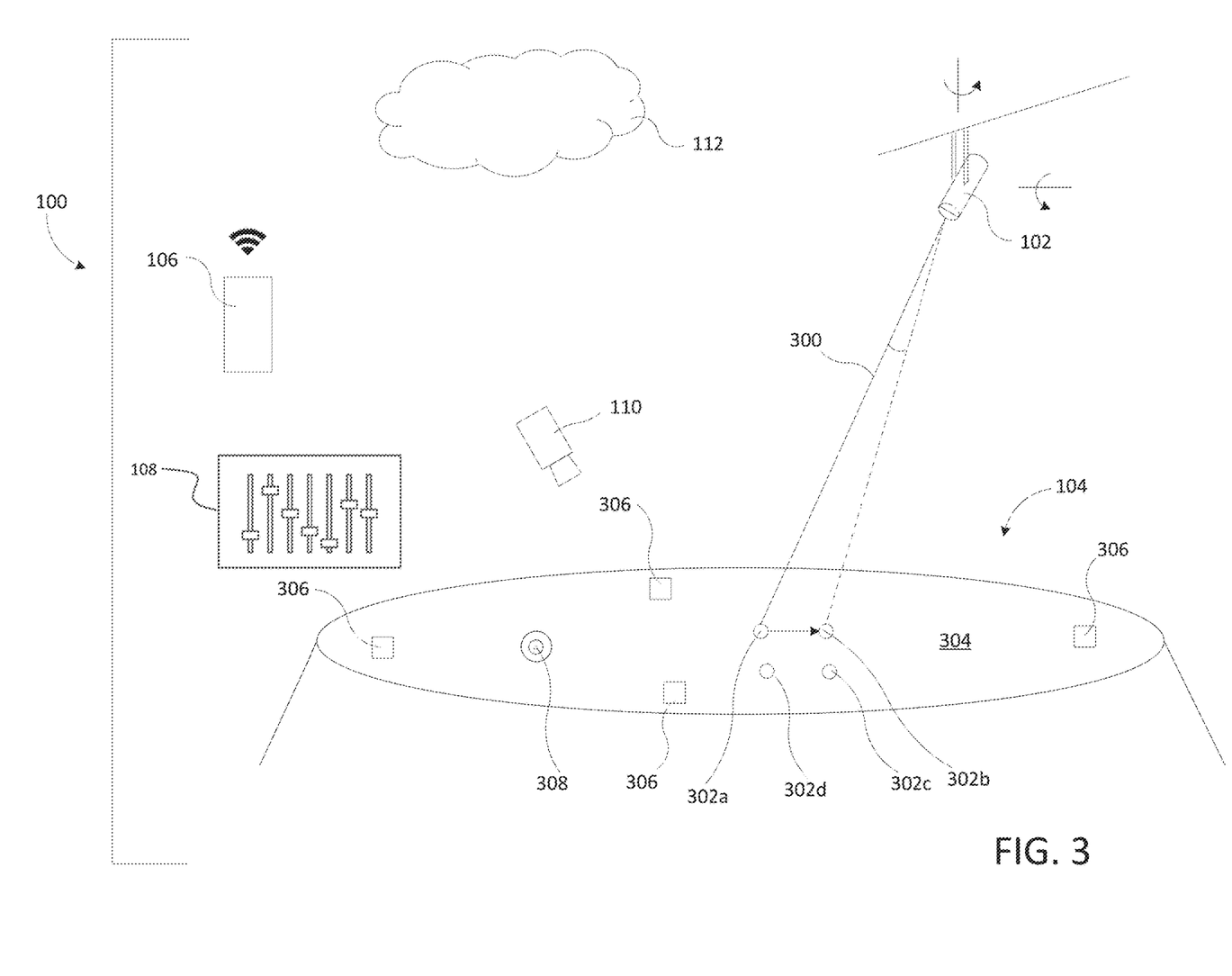
FIG. 3 illustrates cameras and lighting fixtures in a venue for the system of FIG. 1.

FIG. 3 illustrates the control board 108, the lighting fixture 102, the camera 110, and the user input device 106A-106D of the system 100 in the venue 104. The user input device 106A-106D directs the lighting fixture 102 such that a lighting beam 300 projecting from the lighting fixture 102 strikes at interaction points 302A, 302B, 302C, 302D on a stage surface 304 at the venue 104. The interaction points 302 may be set via a user input of the user input device 106A-106D prior to directing the lighting fixture 102. A user may directly control the movement of the lighting fixture 102, or the lighting fixture 102 may move according to a preprogrammed pattern.

Figure 3A:
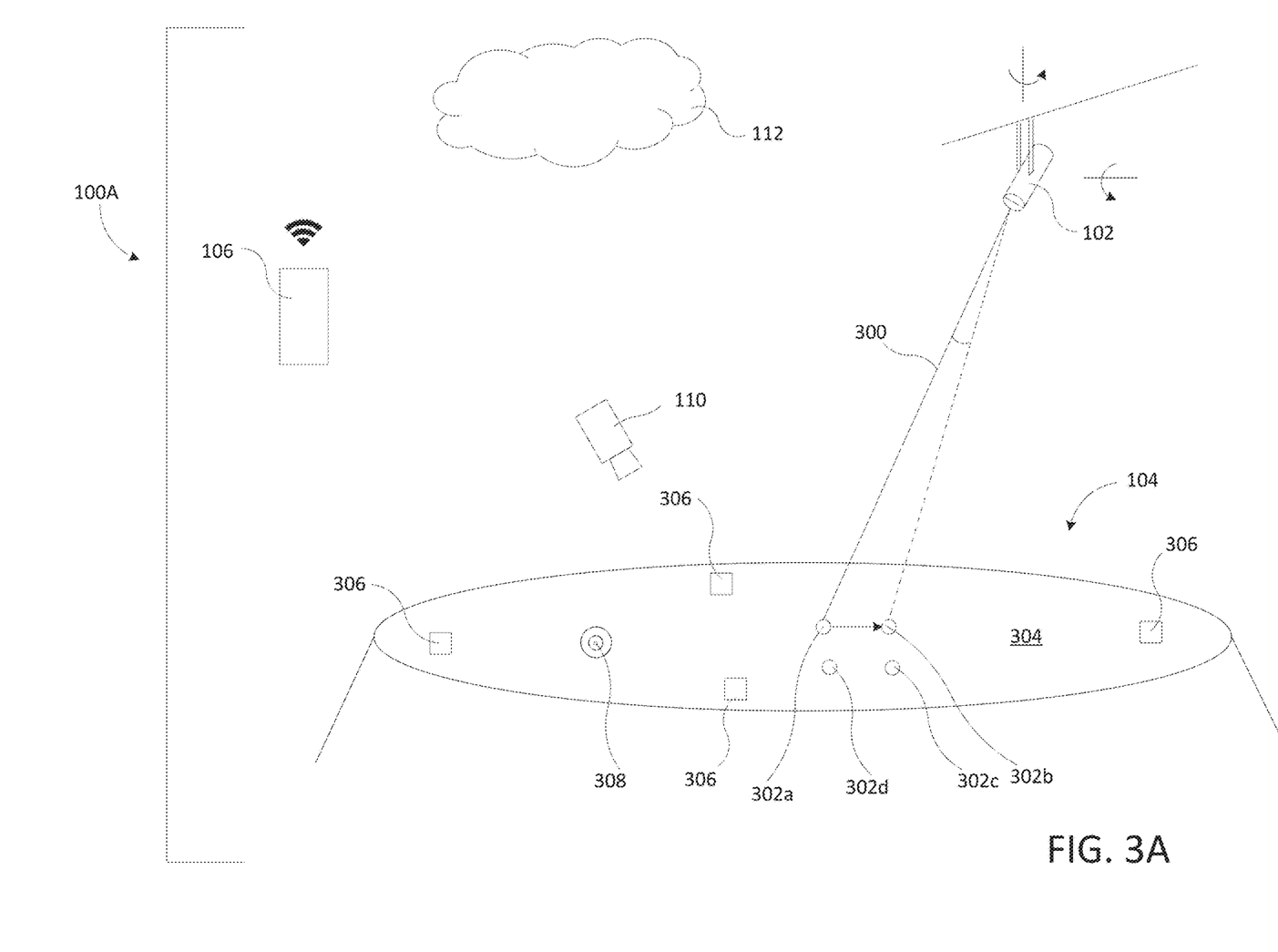
FIG. 3A illustrates cameras and lighting fixtures in a venue for the system of FIG. 1A.

FIG. 3A illustrates the system 100A in the venue 104. As described above, the system 100A removes the control board 108, and the user input device 106A-106D is configured to directly communicate with the lighting fixture 102 and the camera 110.

In some embodiments, the lighting beam 300 moves to at least three interaction points (302A, 302B, and 302C). Other embodiments include the lighting beam 300 moving to a fourth interaction point 302D. Other embodiments include the lighting beam 300 moving to more than four interaction points 302. The movement of the lighting fixture 102 is accomplished by changing the angle of the lighting fixture 102 by either panning or tilting the lighting fixture 102. The controller 200 is configured to store the angular change data corresponding to the lighting fixture 102 movement to move the lighting beam 300 from the first interaction point 302A to the second interaction point 302B, from the second interaction point 302B to the third interaction point 302C, and so on. In some embodiments, the movement of the lighting fixture 102 is in a sequence of the interaction points 302.

With reference to FIGS. 3 and 3A, the controller 200 is further configured to store the coordinate data of each of the at least three interaction points 302 on the surface 304. In some embodiments, the coordinate data is input by a user, such as when the user directly controls the movement of the lighting fixture 102. In some embodiments, multiple interaction points 302 are plotted in a model, and the user indicates a desired lighting beam destination 308 by, for example, standing at one of the interaction points 302 while holding the user device 106A-106D. In some embodiments, the user walks along a path of the surface 304 and indicates multiple desired lighting beam destinations 308 that correspond to the interaction points 302. The interaction points 302 designated by the user correspond to a path along the surface 304 in which the lighting fixture 102 may be moved in a sequential order.

In some embodiments, the coordinate data is determined by the controller 200 by calculating a position of the user device 106A-106D relative to one or more reference points 306 with scan data from one or more cameras 110. The cameras 110 may be integrated into the user device 106A-106D, wirelessly connected to the user device 106A-106D, connected by wire to the user device 106A-106D, or otherwise associated. The reference points 306 provide orientation and distance information for the user device 106A-106D. In some embodiments, the reference points 306 are visible marks on the surface 304. Other embodiments include at least one reference point 306 in the form of a sensor readable marker that is not visible to the human eye (e.g., an infrared marker). Using known computer vision, image recognition, and scanning applications (e.g., a simultaneous localization and mapping ["SLAM"] program), the controller 200 can calculate distances between designated points on the surface 304 after the user device 106A-106D has been properly calibrated with the reference points 306. In some embodiments, the coordinate data is determined by the controller 200 by calculating a position of the user device 106A-106D relative to the surface 304 without the one or more reference points 306.

To determine the interaction points 302 where the lighting beam 300 contacts the surface 304 without user input information regarding the locations, the controller 200 is configured to determine a centroid of the lighting beam through scan data provided by the camera 110. The centroid can be found regardless of angle of attack of the lighting beam 300 through any appropriate method including, for example, light intensity analysis of the surface 304. As such, at each of the interaction points 302, the image data of the lighting beam 300 is captured by the camera 110 and analyzed by the controller 200. Once the analysis is complete, the controller 200 is configured to return values for the coordinate data of each of the interaction points 302 relative to the one or more reference points 306.

Because the lighting fixture 102 control is paired with the controller 200, the controller 200 is able to quantify the change in angle each time the lighting fixture 102 moves. Although this change in angle is known to the controller 200 as a relative angle of the lighting fixture 102 from one position to another and not an absolute angle relative to the surface 304, the absolute angles can be found through mathematical calculations using a perspective inversion solution described generally below.

To calculate the position of the lighting fixture 102 relative to the stage surface 304, the perspective inversion solution uses the length of each side of a triangle that is traced by the lighting beam 300 on the stage surface 304 and the changes in angle of the lighting fixture 102 that created that triangle. The length of the sides of the triangle can be found with the at least three interaction points 302 coordinate data input and/or calculation as described above. The angles are known by virtue of the controller 200 controlling the lighting fixture 102, as described above.

Because there can be a degree of uncertainty present when calculating the position of the lighting fixture 102 based on only three interaction points 302A, 302B, and 302C, some embodiments include a fourth interaction point 302D. With four interaction points 302A, 302B, 302C, 302D, the controller 200 is configured to sequentially determine sets of three interaction points (e.g., 302A, 302B, and 302C first, 302B, 302C, and 302D second, 302A, 302C, and 302D third, etc.) and is configured to return a value for the lengths of the lighting beam 300 as it existed when it was directed to each of the interaction points 302A, 302B, 302C, 302D. The controller 200 is then configured to compare these results as they overlap in order to calculate the values with greater certainty. Other embodiments include more than the four interaction points 302. Such embodiments add even further accuracy to the calculation. Once the length of the lighting beam 300 from the lighting fixture 102 to each individual interaction points 302A, 302B, 302C, 302D is found, the controller 200 is configured to, for example, trilaterate or quadrilaterate the location of the lighting fixture 102. The point at which the spheres of possible solutions for the interaction points 302A, 302B, 302C, 302D cross is designated as the location of the lighting fixture 102. This calculation actually returns two results-one above the stage surface 304 and one below the stage surface 304. The controller 200 is configured to discard the result below the stage surface 304.

In some embodiments of the system 100 and/or the system 100A, the controller 200 is further configured to run an optimizer operation with the possible positions of the lighting fixture 102. Because the measurements could be off slightly or the control feedback may have noise in the signal, an optimizer operation can more accurately determine the position of the lighting fixture 102 (e.g., improve accuracy of the position of the lighting fixture). The optimizer runs calculations using the law of cosines with the values it has from previously running the perspective inversion solution. The optimizer takes the length of the lighting beam 300 from the lighting fixture 102 to each individual interaction point 302A, 302B, 302C, 302D, combines that data with the known changes in angle of the lighting fixture 102, and determines possible values for the distances on the stage surface 304 between the interaction points 302A, 302B, 302C, and 302D. Because these distances are known through measurement or other methods described above, the optimizer compares these known distances with the determined distances to gauge the accuracy of the results from the perspective inversion solution.

An example of an appropriate optimizer operation is a limited memory Broyden-Fletcher-Goldfarb-Shanno ("LBFGS") optimizer, although other optimizer operations may be used. If the optimizer operation returns results that converge to a value, that particular value is determined to be more accurate than the initial value. If the results do not converge to a value and instead scatter, the initial value is returned as accurate enough to continue without further attempting the optimizer operation. After these steps, the location of the lighting fixture 102 is again trilaterated (or quadrilaterated). This location is then output as the most accurate estimation of the position of the lighting fixture 102 relative to the stage surface 304 (or the reference points 306).

After the controller 200 has determined the position of the lighting fixture 102, the controller 200 is configured to determine the orientation of the lighting fixture 102 relative to the stage surface 304. In some embodiments, however, the position calculation for the lighting fixture 102 and the orientation calculation for the lighting fixture 102 are both accomplished with the optimizer operation.

The controller 200 uses any three of the interaction points 302 on the stage surface 304 and the corresponding relative angular change information from the control of the lighting fixture 102. The relative angular change information includes pan, tilt, or both pan and tilt. The controller 200 determines spherical coordinates of the interaction points 302 receiving the lighting beam 300 prior to the lighting fixture 102 being oriented in each position. As the lighting fixture 102 is moved to the interaction points 302 in a sequence, the controller 200 determines the spherical coordinates for each interaction point 302 so that the lighting fixture may be moved between interaction points 302 (e.g., from interaction point 302A to interaction point 302B) without input from the user. These spherical coordinates are relative spherical coordinates, in that they include pan and tilt angles of the lighting fixture 102 relative to the axis of the lighting beam 300, and the origin is the position of the lighting fixture 102 (i.e., the focal point of the lighting beam 300).

The controller 200 is configured to translate the known Cartesian coordinates of the found position of the lighting fixture 102 and the known interaction points 302 relative to the reference points 306 (i.e., x, y, and z coordinates of each interaction point 302 relative to the reference points 306) into real-world spherical coordinates with the lighting fixture 102 as the origin. Some embodiments include the reference points 306 being one of the known interaction points 302 in this calculation.

The controller 200 is then configured to perform a matrix transformation utilizing both the relative spherical coordinates and the real-world spherical coordinates to translate the relative spherical coordinates of the orientation of the lighting fixture 102 at each position into real-world spherical coordinates (e.g. relative to a reference plane, which may be referred to as absolute spherical coordinates). Once this relationship is determined, the yaw, pitch, and roll information of the orientation of the lighting fixture 102 relative to the stage surface 304 is extracted. In some embodiments, the yaw, pitch, and roll may be referred to as absolute angles of the lighting fixture 102 with reference to the surface 304, which includes a plane of the interaction points 302A, 302B, 302C, and 302D. This information is the absolute orientation of the lighting fixture 102 regardless of mounting methods.

After the above calculations have been completed, the controller 200 is configured to present the results as the indicated position and orientation of the lighting fixture 102

(e.g., the controller 200, or a user device 106A-106D is paired with the three-dimensional model space of the venue). With this information, the controller 200 can alter image data relating to the lighting fixture 102 and the lighting beam 300 in an interactive environment and control the lighting fixture 102. Once the lighting fixtures 102 in the venue 104 have been identified, classified, and located, the above calculated information can be used to implement transitions of various styles. For example, the controller 200 determines a light attribute for each interaction point 302. The controller 200 communicates the light attribute to the lighting fixture 102 and the lighting fixture 102 applies the light attribute at each interaction point along the sequence. The light attribute may be a light color, a light intensity, a light focus, etc.

It should be noted, however, that the three-dimensional model space of the venue may, in some embodiments, be rendered for observation by the user, but, in other embodiments, may instead be used for internal calculations by the system 100, 100A without producing a rendering of the model for user observation or interaction. In some embodiments, the three-dimensional model space is displayed via the user device 106. In other embodiments, the three-dimensional model space is displayed via the user interface 204 of the controller 200. The three-dimensional model space may include the interaction points 302 shown as a path. In some embodiments, the user may retroactively adjust the interaction points 302 once displayed in the three-dimensional model space.

With continued reference to FIGS. 3 and 3A, the above calculated information can also be used to alter command string data sent to the lighting fixture 102 in order to translate interaction points 302 designated on the surface 304 into appropriate angular changes of the lighting fixture 102 to cause the lighting beam 300 to be directed to the designated interaction points 302. Some embodiments of the system 100, 100A include the controller 200 configured to control the lighting fixture 102 according to the altered command string data.

In some embodiments, the indication of the interaction points 302 is made on a touchscreen of the user device 106A-106D utilizing an augmented reality interface. In such an interface, the user sees the surface 304 on the touchscreen and may point to an interaction point 302 on the surface 304 on the touchscreen. The controller 200 is configured to then convert this indicated portion of the screen into an equivalent position of the interaction point 302 on the surface 304. The controller 200 is configured to relate the orientation of the capture view of the camera 110 with the surface 304 based on a calibration with one or more reference points 306.

Additionally or alternatively, the system 100, 100A uses one or more inertial measurement units ("IMUs") coupled with the user device 106A-106D to determine the position and orientation data of the user device 106A-106D. Cameras 110 may not be necessary in this instance, but the user device 106A-106D would be paired to the three-dimensional model space by positioning and orienting the device in a known home arrangement and recording the data from the IMUs at that home arrangement. In embodiments of the system 100, 100A using augmented reality libraries (e.g., ARCore, ARKit, etc.), both IMUs and cameras 110 can be utilized to improve accuracy of the data.

In some embodiments, the system 100, 100A uses one or more sensors (one example of which being the cameras 110) to determine the position of the user device 106A-106D. As stated above, the one or more sensors can include cameras 110 and/or IMUs. Additionally or alternatively, the one or more sensors can include a Wi-Fi, Bluetooth, ZigBee, or other system having one or more proximity beacons. Other example sensors can include infrared cameras, thermal cameras, depth cameras, ultra-wideband (UWB) radar sensors, or the like to determine focus points of the lighting beam 300 at each interaction point 302.

Once the real-world position of each of the interaction points 302 on the surface 304 is determined, the controller 200 is configured to send a control signal to one or more motors to actuate movement of the lighting fixture 102 in a sequence corresponding to the interaction points 302. The lighting fixture 102 moves to the appropriate orientation to project the lighting beam 300 at each interaction point 302. For example, the controller 200 is configured to translate the real-world Cartesian coordinates of each of the interaction points 302 into the altered control string described above to operate the lighting fixture 102 such that the lighting beam 300 moves appropriately in the three-dimensional model space to each interaction point 302 in the sequence without additional input from the user.

In some embodiments of the system 100, 100A, the indication of the interaction points 302 for the lighting beam 300 on the surface 304 at the venue 104 can be made by aiming the center of the capture view of the camera 110 at the interaction point 302. As described above, the controller 200 is configured to convert this center of the capture view into an equivalent position of the interaction point 302 on the actual surface 304. In this configuration, the indication of the interaction point 302 may be actuated by a distinct command, such as a voice command, the press of a button, or the like.

In some embodiments of the system 100, 100A, the indication of the desired interaction point 302 of the lighting beam 300 on the surface 304 at the venue 104 is made by pointing an end of the user device 106A-106D in a direction with the camera view of the camera 110 pointing in an orthogonal direction. With a smartphone 106D, for instance, a user could point the top end of the smartphone 106D at the desired interaction point 302 while the camera 110 is directed toward the surface 304. In this configuration, the lighting beam interaction point 302 may be set at a constant distance, potentially designated by the user, from the end of the smartphone 106D or from the center of the capture view of the camera 110 in an orthogonal direction from the direction of the capture view. In some embodiments, the user device 106A-106D determines the location of the desired interaction point 302 by pointing the end of the user device 106A-106D to the desired interaction point 302, and using the known location (coordinates) of the user device 106A-106D in the venue along with a tilting angle of the device 106A-106D relative to the surface 304 (e.g., determined using internal IMUs of the device 106A-106D) to determine the location of the of the desired interaction point 302 in the venue 104.

In some embodiments of the system 100, 100A, the indication of the desired interaction point 302 of the lighting beam 300 is set as the location of the user device 106A-106D itself. The controller 200 determines the location of the user device 106A-106D based on the capture data from the camera 110. This data is processed to calculate the location relative to one or more reference points 306. The controller 200 is configured to designate the current location of the user device 106A-106D relative to the reference points 306 as the interaction point 302. As described above, the indication of the desired interaction point 302 as the location of the user device 106A-106D can be actuated by a distinct command.

Figure 4:
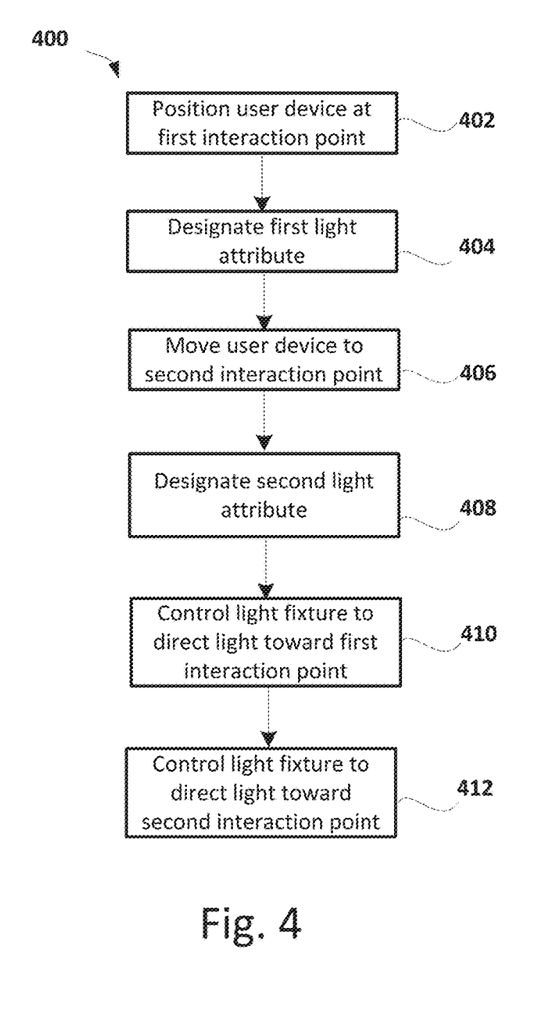
FIG. 4 is a flowchart of a method for controlling the movement of a light fixture based on a three-dimensional focus path.

As shown in FIG. 4, the system 100, 100A may operate according to a method 400 to control the movement of a lighting fixture 102 based on a three-dimensional focus path. First, the user positions the user device 106 at the first interaction point 302A in the venue 104 (STEP 402). The user may position the user device 106 at the first interaction point 302A prior to turning on the lighting fixture 102. Positioning the user device 106 at the first interaction point 302A may occur before controlling the lighting fixture 102. In some embodiments, the first interaction point 302A is the start of the three-dimensional focus path. In other embodiments, the first interaction point 302A is a location after the start of the three-dimensional focus path. The user may select the first interaction point 302A via a user input (i.e., selecting the position of the user device 106 relative to the surface 304) of the user device 106.

The user then designates a first light attribute (e.g., a first light color, a first light intensity, a first light focus, etc.) corresponding to the first interaction point 302A via the user device 106 (STEP 404). Next, the user moves the user device 106 to the second interaction point 302B in the venue 104 (STEP 406). For example, the user may walk along a path of the venue 104 and select the second interaction point 302B following the first interaction point 302A. The selection of the second interaction point 302A indicates the locations of the interaction points 302 for the three-dimensional path displayed via the user device 106. In some embodiments, the user device 106 is positioned on the stage surface 304 of the venue 104 while selecting the first interaction point 302A and the second interaction point 302B. The user then designates a second light attribute (e.g., a second light color, a second light intensity, a second light focus, etc.) corresponding to the second interaction point 302B via the user device 106 (STEP 408). In some embodiments, the second light attribute is different from the first light attribute. For example, the first light attribute transitions to the second light attribute as the lighting device 102 is moved from the first interaction point 302A to the second interaction point 302B. It should be understood that, although the three-dimensional path is described as including a first interaction point 302A and a second interaction point 302B, the three-dimensional path may include a third interaction point 302C, a fourth interaction point 302D, or any number of interaction points designated by the user.

The lighting fixture 102 is then powered on and the user device 106 communicates the first interaction point 302A including the first light attribute and the second interaction point 302B including the second light attribute to the lighting fixture 102. The lighting fixture 102 is automatically controlled to direct the lighting beam 300 to the first interaction point 302A with the first light attribute (STEP 410). The controller 200 may determine a first pan angle and a first tilt angle of the lighting fixture 102 based on a position and an orientation, as described with reference to system 100, 100A above, of the user device 106 at the first interaction point 302A. The lighting fixture 102 may be automatically controlled to direct the light beam 300 to the first interaction point 302A based on the first pan angle and the first tilt angle. The lighting fixture 102 is then automatically controlled to direct the lighting beam 300 to the second interaction point 302B with the second light attribute (STEP 412). In some embodiments, the user device 106 is not positioned on the stage surface 304 of the venue 104 while controlling the lighting fixture 102. The controller 200 may determine a second pan angle and a second tilt angle of the lighting fixture 102 based on a position and an orientation, as described with reference to system 100, 100A above, of the user device 106 at the second interaction point 302B. The lighting fixture 102 may be automatically controlled to direct the light beam 300 to the second interaction point 302B based on the second pan angle and the second tilt angle. In some embodiments, after directing the lighting fixture 102 to the second interaction point 302B, the method 400 ends. In other embodiments, the lighting fixture 102 is directed to a third interaction point 302C, a fourth interaction point 302D, or directs the lighting fixture 102 back to the first interaction point 302A to repeat the method 400.

Figure 5:
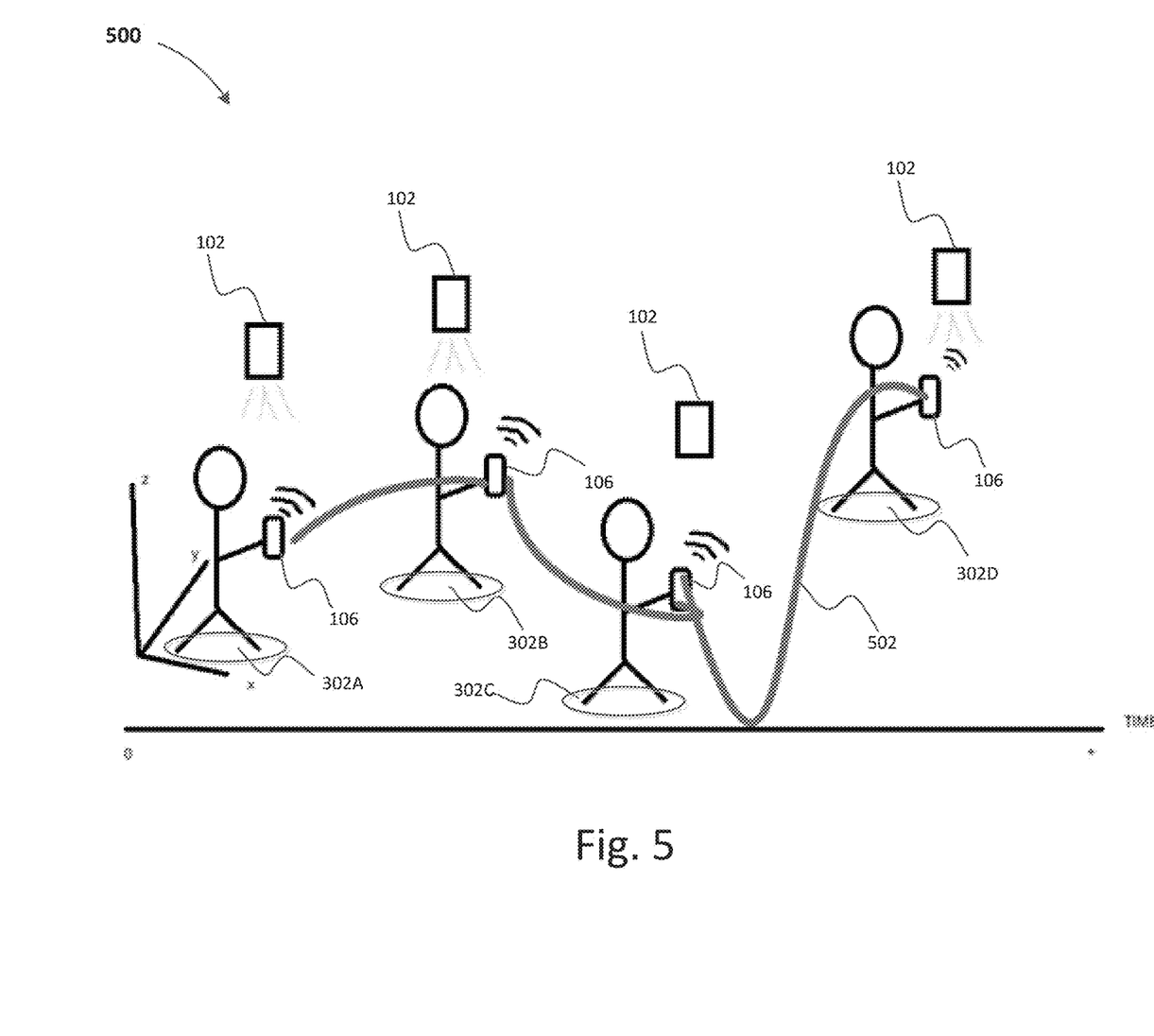
FIG. 5 illustrates a model for creating interaction points of a three-dimensional focus path with a user device.

FIG. 5 illustrates a model 500 of the method 400 for use in the system 100, 100A. The model 500 illustrates a user holding the user device 106 and moving along a path 502. The user reaches the first interaction point 302A at a first time. When the user reaches the first interaction point 302A, the user designates the first interaction point 302A and the first light attribute via the user device 106. The Cartesian coordinates of the first interaction point 302A are recorded in the memory 210 of the controller 200 and converted to spherical coordinates. The spherical coordinates correspond to the first pan angle and the first tilt angle of the lighting fixture 102 to direct the light beam 300 toward the first interaction point 302A. The first pan angle and the first tilt angle are saved in the memory 210 for recreation by the lighting fixture 102 to direct the light beam 300 to the first interaction point 302A once the lighting fixture 102 is turned on. The user then reaches the second interaction point 302B along the path 502 at a second time. When the user reaches the second interaction point 302B, the user designates the second interaction point 302B and the second light attribute via the user device 106. The Cartesian coordinates of the second interaction point 302B are recorded in the memory 210 of the controller 200 and converted to spherical coordinates. The spherical coordinates correspond to the second pan angle and the second tilt angle of the lighting fixture 102 to direct the light beam 300 toward the second interaction point 302B. The second pan angle and the second tilt angle are saved in the memory 210 for recreation by the lighting fixture 102 to direct the light beam 300 to the second interaction point 302B once the lighting fixture 102 is turned on. The user may then reach the third interaction point 302C along the path 502 at a third time. When the user reaches the third interaction point 302C, the user designates the third interaction point 302C and the third light attribute via the user device 106. The Cartesian coordinates of the third interaction point 302C are recorded in the memory 210 of the controller 200 and converted to spherical coordinates. The spherical coordinates correspond to a third pan angle and a third tilt angle of the lighting fixture 102 to direct the light beam 300 toward the third interaction point 302C. The a third pan angle and the third tilt angle are saved in the memory 210 for recreation by the lighting fixture 102 to direct the light beam 300 to the third interaction point 302C once the lighting fixture 102 is turned on. The user may then reach the fourth interaction point 302D along the path 502 at a fourth time. When the user reaches the fourth interaction point 302D, the user designates the fourth interaction point 302D and the fourth light attribute via the user device 106. The Cartesian coordinates of the fourth interaction point 302D are recorded in the memory 210 of the controller 200 and converted to spherical coordinates. The spherical coordinates correspond to a fourth pan angle and a fourth tilt angle of the lighting fixture 102 to direct the light beam 300 toward the fourth interaction point 302D. The fourth pan angle and the fourth tilt angle are saved in the memory 210 for recreation by the lighting fixture 102 to direct the light beam 300 to the fourth interaction point 302D once the lighting fixture 102 is turned on.

Figure 6:
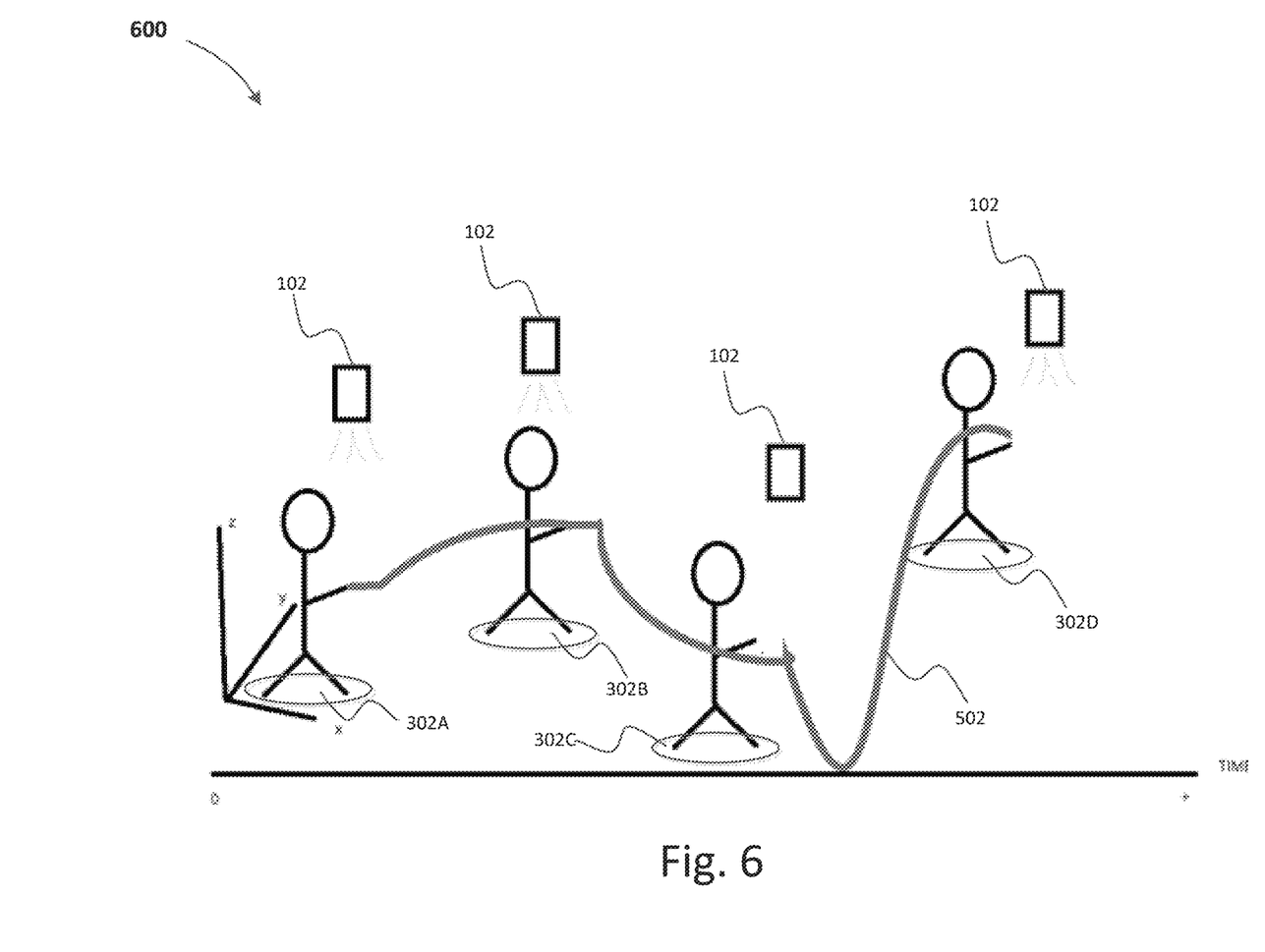
FIG. 6 illustrates a model for controlling the movement of a lighting fixture based on the interaction points of FIG. 5, for use with the system of FIG. 1 and/or FIG. 1A.

FIG. 6 illustrates a model 600 of the method 400, for use in the system 100, 100A, for controlling the movement of the lighting fixture 102 after the lighting fixture is turned on. The model 600 illustrates a user without the user device 106 and moving along the path 502. Once the lighting fixture 102 is turned on, the controller 200 communicates the spherical coordinates of each interaction point 302 to the lighting fixture 102. The lighting fixture 102 then identifies each interaction point 302 based on the spherical coordinates. The lighting fixture 102 recreates the first pan angle and the first tilt angle prior to directing the light fixture 102 toward the first interaction point 302A. As the user reaches the first interaction point 302A at the first time, the lighting fixture 102 directs the light beam 300 including the first light attribute to the first interaction point 302A. The lighting fixture 102 then recreates the second pan angle and the second tilt angle prior to directing the light fixture 102 toward the second interaction point 302B. As the user reaches the second interaction point 302B at the second time, the lighting fixture 102 directs the light beam 300 including the second light attribute to the second interaction point 302B. The lighting fixture 102 then recreates the third pan angle and the third tilt angle prior to directing the light fixture 102 toward the third interaction point 302C. As the user reaches the third interaction point 302C at the third time, the lighting fixture 102 directs the light beam 300 including the third light attribute to the third interaction point 302C. The lighting fixture 102 then recreates the fourth pan angle and the fourth tilt angle prior to directing the light fixture 102 toward the fourth interaction point 302D. As the user reaches the fourth interaction point 302D at the fourth time, the lighting fixture 102 directs the light beam 300 including the fourth light attribute to the fourth interaction point 302D.

While embodiments described herein have primarily referred to controlling traditional lighting fixtures (e.g., lighting fixture 102) in the venue 104, in some embodiments, the lighting fixture 102 is a lighting device capable of video projection (e.g., a video projector). For example, a user holding the user device 106 and moving along a path 502, such as the model 500 of the method 400, may move along, for instance, a circular path. The path 502 may be any shape in which the user moves with the user device 106. The user designates interaction points 302 along the path 502. The controller 200 then determines a pan angle and/or tilt angle corresponding to each one of the interaction points 302 along the path 502. The controller 200 communicates each pan angle and/or tilt angle to the video projector and moves the video projector to follow the path 502 based on each pan angle and/or tilt angle. In some embodiments, the controller 200 uses the recorded path 502 to generate a projected video to communicate to the video projector to display on the stage surface 304 of the venue 104 related to the path 502. For example, the video projector may be mounted directly above the stage surface 304 and displays light that appears to draw the path 502 on the stage surface 304 that matches each time that the respective interaction point 302 is designated by the user on the user device 106, as described above in FIG. 6. In other examples, the video projector displays a pattern on the stage surface 304 and light along the path 502 may be displayed by the video projector to interrupt the pattern. For example, a pattern that resembles moving water is displayed, via the video projector, on the stage surface 304 and light along the path 502 may be displayed to interrupt the moving water pattern, such as creating ripples or waves in the moving water pattern via the video projector.

Thus, embodiments described herein provide methods and systems for creating three-dimensional focus paths with a user device for directing or controlling a lighting fixture in a venue. Various features and advantages of some embodiments are set forth in the following claims.

What is claimed is:

1. A system comprising:
a lighting fixture;
a user device; and
a controller in communication with the lighting fixture and the user device, the controller including an electronic processor and a memory, the memory storing instructions that when executed by the electronic processor configure the controller to:
identify a plurality of interaction points in a sequence, including positioning the user device at each of the plurality of interaction points, in a venue;
receive a plurality of commands, each command associated with at least one of the plurality of interaction points, the commands corresponding to at least one selected from a group of light color, light intensity, and light focus; and
control the lighting fixture to move according to the sequence and change at least one selected from a group of light color, light intensity, and light focus according to the commands.

2. The system of claim 1, further comprising at least one display associated with the user device, wherein the user device is configured to display, via the at least one display, a three-dimensional representation of the venue including the plurality of interaction points.

3. The system of claim 1, further comprising at least one camera associated with the user device, wherein the controller is further configured to identify the plurality of interaction points in the sequence based on a capture view of the at least one camera.

4. The system of claim 1, wherein the controller is further configured to:
determine a pan angle and a tilt angle of the lighting fixture based on a position and an orientation of the user device at each of the plurality of interaction points in the sequence.

5. The system of claim 1, wherein the command associated with each respective interaction point is different for each respective interaction point.

6. The system of claim 1, wherein each command of the plurality of commands is associated with one of the plurality of interaction points.

7. The system of claim 1, wherein the controller is associated with a remote server.

8. The system of claim 1, wherein the controller is associated with a light control board.

9. A method for operating a lighting fixture, the method comprising:
positioning a user device at a first interaction point in a venue;
designating a first light attribute, the first light attribute including at least one selected from a group of a first light color, a first light intensity, and a first light focus corresponding to the first interaction point;
moving the user device to a second interaction point in a venue;

designating a second light attribute, the second light attribute including at least one selected from a group of a second light color, a second light intensity, and a second light focus corresponding to the second interaction point, the second light attribute being different than the first light attribute;

controlling the lighting fixture to direct light having the first light attribute toward the first interaction point; and controlling the lighting fixture to direct light having the second light attribute toward the second interaction point.

10. The method of claim 9, wherein positioning the user device and designating the light attributes occurs before controlling the lighting fixture.

11. The method of claim 9, wherein
the user device is positioned on a stage in the venue for both the first interaction point and the second interaction point, and
the user device is not positioned on the stage in the venue while controlling the lighting fixture.

12. The method of claim 9, wherein the controlling the lighting fixture to direct light having the first light attribute toward the first interaction point includes:
determining a first pan angle and a first tilt angle of the lighting fixture based on a position and an orientation of the user device at the first interaction point; and
controlling the lighting fixture to direct light based on the first pan angle and the first tilt angle.

13. The method of claim 12, wherein the user device is associated with at least one camera, and
wherein the determining a first pan angle and a first tilt angle of the lighting fixture based on a position and an orientation of the user device at the first interaction point includes:
using a capture view of the at least one camera to determine the position and the orientation of the user device at the first interaction point.

14. The method of claim 12, wherein the controlling the lighting fixture to direct light having the second light attribute toward the second interaction point includes:
determining a second pan angle and a second tilt angle of the lighting fixture based on a position and an orientation of the user device at the second interaction point; and
controlling the light fixture to direct light based on the second pan angle and the second tilt angle.

15. The method of claim 9, wherein the user device is associated with at least one display, the method further comprising:

displaying, via the at least one display, a three-dimensional representation of the venue including at least the first interaction point and the second interaction point.

16. A method for operating a lighting fixture, the method comprising:
identifying a first interaction point, including positioning a user device at the first interaction point, in a venue with the lighting fixture turned off;
identifying a second interaction point, including positioning the user device at the second interaction point, in the venue after identifying the first interaction point;
turning on the lighting fixture after the first interaction point and the second interaction point have been identified;
automatically directing the lighting fixture to the first interaction point; and
automatically directing the lighting fixture to the second interaction point after the first interaction point.

17. The method of claim 16, wherein the identifying a first interaction point, via a user device, in a venue with the lighting fixture turned off includes:
determining a first pan angle and a first tilt angle of the lighting fixture based on a position and an orientation of the user device at the first interaction point.

18. The method of claim 17, wherein the identifying a second interaction point, via the user device, in the venue after identifying the first interaction point includes:
determining a second pan angle and a second tilt angle of the lighting fixture based on a position and an orientation of the user device at the second interaction point.

19. The method of claim 18, the method further comprising:
communicating, via the user device, the first interaction point and the second interaction point to the lighting fixture after turning on the lighting fixture.

20. The method of claim 19, the method further comprising:
recreating, via the light fixture, the first pan angle and the first tilt angle prior to automatically directing the light fixture; and
recreating, via the light fixture, the second pan angle and the second tilt angle prior to automatically directing the light fixture.

21. The method of claim 16, further comprising
changing a position of the user device in the venue after identifying the first interaction point, and
wherein identifying the second interaction point begins after changing the position of the user device.

* * * * *